United States Patent
Perry, Jr.

(10) Patent No.: US 7,399,413 B2
(45) Date of Patent: Jul. 15, 2008

(54) RECIRCULATING FILTER

(76) Inventor: Carlos V. Perry, Jr., 8142 Talltimbers Dr., Gainesville, VA (US) 20155

( * ) Notice: Subject to any disclaimer, the term of this patent is extended or adjusted under 35 U.S.C. 154(b) by 25 days.

(21) Appl. No.: 10/776,282

(22) Filed: Feb. 12, 2004

(65) Prior Publication Data

US 2004/0159601 A1    Aug. 19, 2004

Related U.S. Application Data

(63) Continuation of application No. 09/764,294, filed on Jan. 19, 2001, now Pat. No. 6,767,457.

(51) Int. Cl.
*B01D 21/00* (2006.01)
*E03F 5/00* (2006.01)

(52) U.S. Cl. .................... 210/532.2; 210/196
(58) Field of Classification Search .......... 210/196, 210/266, 282, 283, 284, 290, 484, 532.2, 210/289, 291; 220/567.1
See application file for complete search history.

(56) References Cited

U.S. PATENT DOCUMENTS

| | | | |
|---|---|---|---|
| 2,278,488 A | 4/1942 | Ralston | 210/282 |
| 3,426,906 A * | 2/1969 | Schroeder | 210/279 |
| 3,738,527 A * | 6/1973 | Townsend | 220/592.25 |
| 3,814,247 A | 6/1974 | Hirs | 210/793 |
| 3,954,612 A | 5/1976 | Wilkerson | 210/86 |
| 4,543,013 A | 9/1985 | Wagner et al. | 405/129.7 |
| 4,710,295 A | 12/1987 | Zabel | 210/336 |
| 5,318,699 A | 6/1994 | Robertson et al. | 210/151 |
| 5,382,363 A | 1/1995 | Boylen | 210/605 |
| 5,417,146 A * | 5/1995 | Zimmer et al. | 99/323.1 |
| 5,480,561 A | 1/1996 | Ball et al. | 210/744 |
| 5,582,716 A | 12/1996 | Nurse, Jr. | 210/121 |
| 5,645,732 A | 7/1997 | Daniels | 210/747 |
| 5,806,702 A * | 9/1998 | Sabo | 220/4.12 |
| 5,979,091 A | 11/1999 | TenBrink | 40/410 |
| 5,997,747 A | 12/1999 | Jowett | 210/670 |
| 6,202,370 B1 * | 3/2001 | Miller et al. | 52/169.14 |
| 6,280,614 B1 | 8/2001 | Berg et al. | 210/170 |

FOREIGN PATENT DOCUMENTS

GB    2280383    *    2/1995

* cited by examiner

*Primary Examiner*—Fred G. Prince
(74) *Attorney, Agent, or Firm*—Greenblum & Bernstein, P.L.C.

(57) ABSTRACT

A self contained filter for a recirculating tank is used in a septic system. The self contained filter is a mattress-like filter made of woven material encapsulating aggregate material therein. The weave of the mattress-like woven material is smaller than the aggregate material. In another aspect, at least one mattress-like filter is placed within a tank.

7 Claims, 3 Drawing Sheets

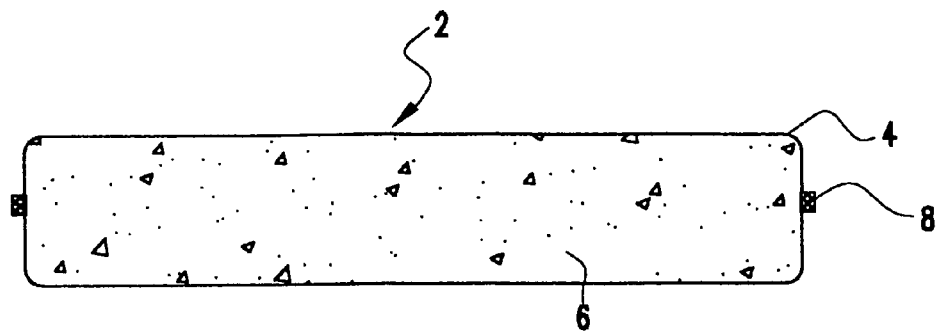
FIG.1
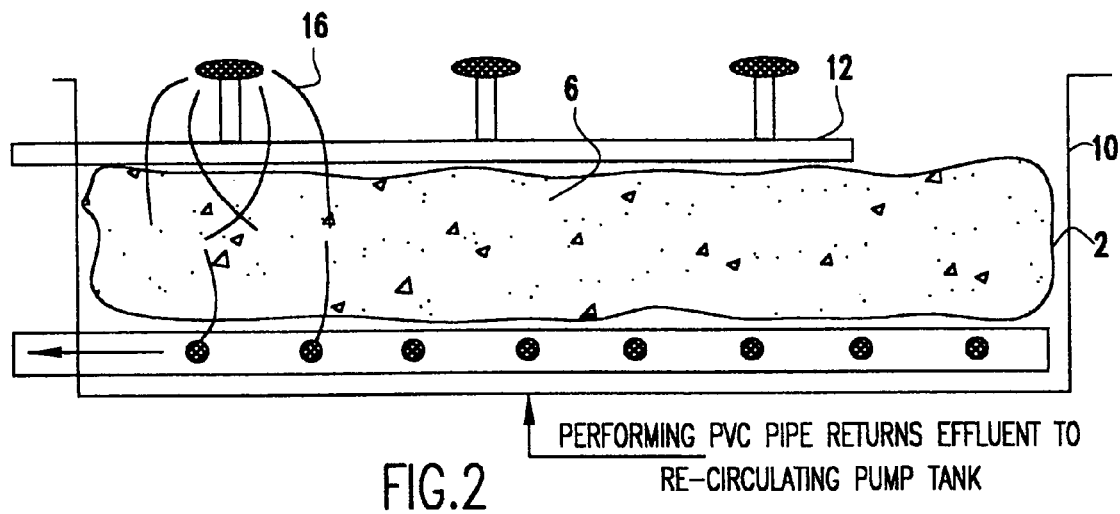
FIG.2  PERFORMING PVC PIPE RETURNS EFFLUENT TO RE-CIRCULATING PUMP TANK
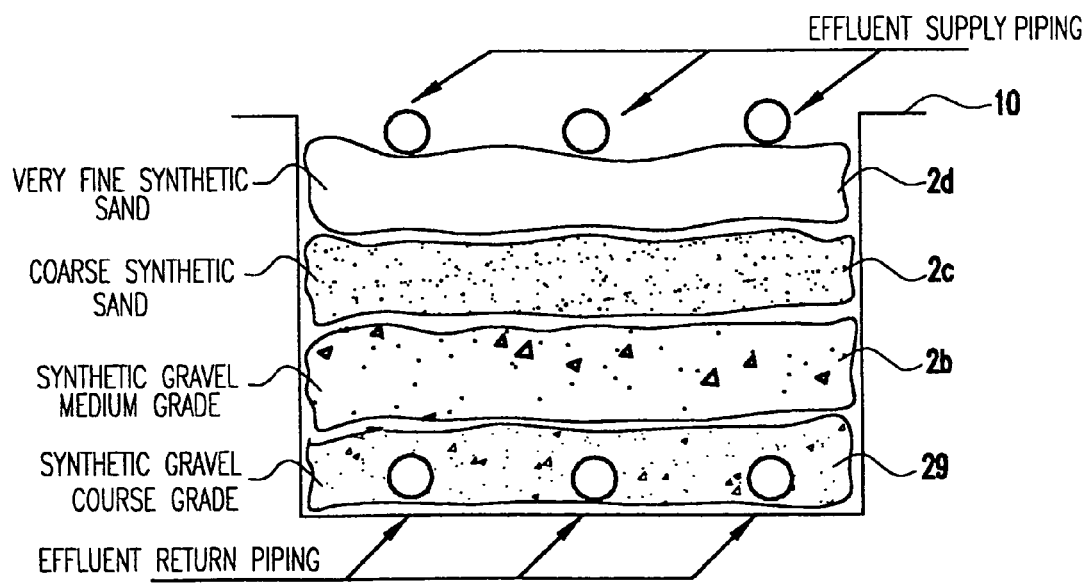
FIG.3

US 7,399,413 B2

RECIRCULATING FILTER

CROSS REFERENCE TO RELATED APPLICATIONS

This application is a continuation application of U.S. patent application Ser. No. 09/764,294 filed Jan. 19, 2001, now U.S. Pat. No. 6,767,457, which is now incorporated herein by reference.

BACKGROUND OF THE INVENTION

1. Field of the Invention

The present invention generally relates to a filter for a recirculating tank and, more particularly, to a self contained filter for a recirculating tank used in a septic system.

2. Background Description

Septic systems are widely used for a variety of applications ranging from single family homes to industrial applications. These systems also vary greatly in design; namely, aerobic and anaerobic type systems. In either type of septic systems, the main objective is to treat wastewater in the most efficient manner in order to ensure that the water is properly filtered for distribution within a drain field or other distribution system.

In certain types of septic systems, a sand filter is used to filtrate the wastewater prior to further treating or distribution of the effluent. The sand filter is disposed within a recirculating tank and includes several layers of varying sized aggregate. For simplicity of discussion, the aggregate is manually disposed within the tank, with the larger sized aggregate on the bottom of tank and the smaller or finer sized aggregates progressively being layered toward the top of the tank. In some systems, one sized aggregate may be used to filter the wastewater; although, it is preferable to use at least a two or more layered sand filter for more efficient filtering.

In operation, wastewater flows into the top of the tank. The wastewater is then filtered through the several layers of the aggregate until the wastewater reaches the bottom of the tank. At the bottom of the tank, the filtered wastewater is then discharged to other portions of the septic system. As is known in the art, the different sized aggregates will filter different sized materials from the wastewater.

However, the use of sand filters pose several problems which decrease the efficiency of the filter and thus the cleaning of the wastewater. First, the top or finer layers of aggregate have a tendency to migrate into the more course layers of aggregate. This migration affects the filtering properties of the system, and leads to the need to completely remove and replace all of the aggregate from the tank. This is a time consuming and costly procedure. Second, compaction of the aggregates also occurs within these systems. Compaction results in puddling of the wastewater at the top of the tank due to lack of air spaces within the several layers of the aggregate. Much like migration, the aggregate within the tank must be replaced in order to correct the compaction of the aggregate. Third, channeling also occurs in these types of sand filters; that is, a channel or tunnel will be formed through all of the aggregate layers. This leads to poor filtering of the wastewater and the need, again, to replace all of the aggregate within the tank. The present invention is adapted to solving these and other problems.

SUMMARY OF THE INVENTION

An object of the present invention is to provide an efficient recirculating sand filter tank used in a septic system.

Another object of the present invention is to prevent migration of aggregate material within a recirculating sand filter tank.

A further object of the present invention is to prevent compaction of aggregate material within a recirculation sand filter tank.

A still further object of the present invention is to prevent channeling of wastewater through aggregate material in a recirculating sand filter tank.

Still another object of the present invention is provide a filter which is easy to install within a recirculating sand filter tank.

In order to provide the above advantages, the present invention includes a mattress-like woven material encapsulating aggregate material therein. The weave of the mattress-like woven material is smaller than the aggregate material. In another aspect of the present invention, at least one mattress-like filter is placed within a tank.

BRIEF DESCRIPTION OF THE DRAWINGS

The foregoing and other objects, aspects and advantages will be better understood from the following detailed description of a preferred embodiment of the invention with reference to the drawings, in which:

FIG. 1 shows a side view of a filter of the present invention;

FIG. 2 shows a cut-away view of the filter in a recirculating tank;

FIG. 3 shows a cut-away view of several filters in a recirculating tank;

DETAILED DESCRIPTION OF A PREFERRED EMBODIMENT OF THE INVENTION

Figure 4:
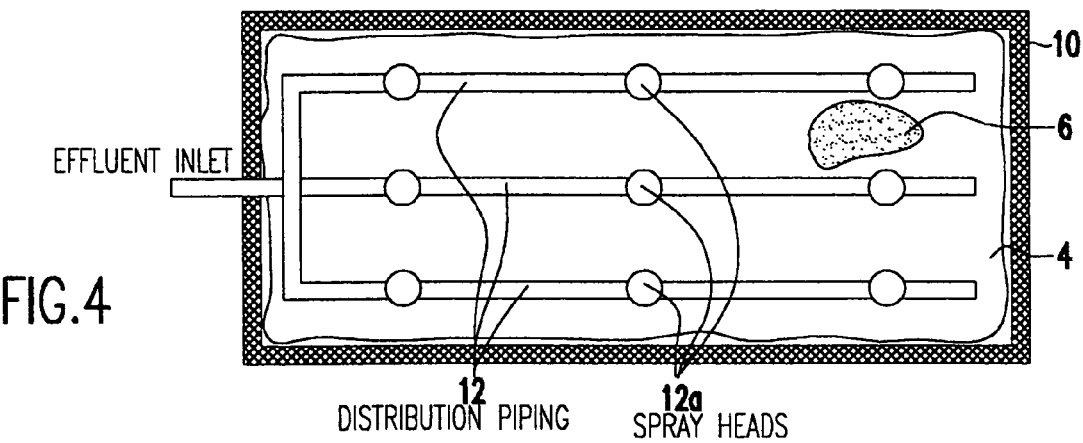
FIG. 4 shows a top view of the filter and recirculating tank.

The present invention is directed to a recirculating sand filter for a septic system. The recirculating sand filter is a mattress-like filter having aggregate or sand completely encapsulated therein. The mattress-like filter preferably contains synthetic aggregate material (e.g., particles) disposed therein, such as synthetic sand, but may equally contain natural sand and other gravel products. For purposes of the present discussion, synthetic particles will be discussed herein; however, it should be understood by those of ordinary skill in the art that the present invention is equally adaptable for use with natural aggregate material.

In the embodiments of the present invention, the synthetic particles will vary in size for each mattress-like filter. The mattress-like filter will be individually sealed once the synthetic particles are placed therein. These individually sealed mattress-like filters are then placed within a tank with the largest aggregate filled mattress-like filter preferably located near the bottom of the tank and the finest aggregate filled mattress-like filters located towards the top of the tank. The mattress-like filter of the subject invention includes several advantages; namely, the filter prevents migration and compaction of the particulate matter as well as prevents the channeling phenomenon. The present invention also is easy to transport and install within a septic system.

Referring now to the drawings, and more particularly to FIG. 1, there is shown a side view of a mattress filter of the present invention. The mattress filter is generally depicted as reference numeral 2, and includes a woven fabric 4 or synthetic cloth. Synthetic aggregate material (e.g., particles) 6 is disposed within the woven cloth 4 and is preferably completed encapsulated therein. That is, the woven cloth 4 is sealed using any conventional method after the synthetic particles 6 are placed therein. In the preferred embodiments, only one sized particle 6 is placed within each individual mattress filter 2. The weave of the woven cloth 4 is smaller than the synthetic particles 6 placed therein so as to ensure that the synthetic particles 6 remain within the mattress filter 2. This prevents migration of the synthetic particles. A handle 8 may be placed on or integrally woven to sides of the mattress 2.

Still referring to FIG. 1, the synthetic cloth 4 is preferably propylene or ethylene clothing. It should be understood, though, that other materials, natural or synthetic, may also be used with the present invention. The synthetic particles 6 are preferably propylene, polychloride or other such material. The specific gravity of the synthetic particles 6 should, in embodiments, be within the range of approximately 0.9+/−3%. This prevents the compaction of the synthetic particles 6 due to the fact that at such specific gravity the synthetic particles 6 will have a tendency to float. The sizes of the synthetic particles 6 will depend on the specific application of use, but may range in size from 0.05 mm to 1½ inches diameter or more. The thickness of the mattress 2 will also vary depending on the specific application of use, but is preferably approximately six inches thick.

FIG. 2 shows a cut-away view of the mattress filter 2 placed within a recirculating tank 10. An effluent piping system 12 is located at the top of the tank 10 and a perforated PVC return pipe 14 is located at the bottom of the tank 10 (below the mattress filter 2). Effluent 16 flows into the tank 10 via the effluent piping system 12. The effluent 16 then flows through the woven cloth 4 of the mattress filter 2 and is filtered by the synthetic particles 6. The effluent, after being filtered, will then flow to the bottom of the tank 10 and into the return piping 14. In the embodiments, the mattress filter 2 will substantially fill the tank 10.

FIG. 3 shows a cut-away view of several mattress filters placed within the tank 10. As seen in this figure, the course synthetic particles are placed in mattress filter 2a at the bottom of the tank 10 and progressively finer materials are placed in the mattress filters 2b-2d, respectively. This provides for proper and most efficient filtration of the effluent. It should be recognized that the present invention is not limited to the arrangement shown in FIG. 3, and that other sized particles and combinations of mattress filters may also be disposed within the tank 10.

FIG. 4 shows a top view of the mattress filter 2 and recirculating tank 10. In this view, spray heads 12a are shown extending from the effluent piping system 12. The spray heads 12a are used to distribute the effluent throughout the mattress filter 2 in an even distribution pattern.

Figure 5:
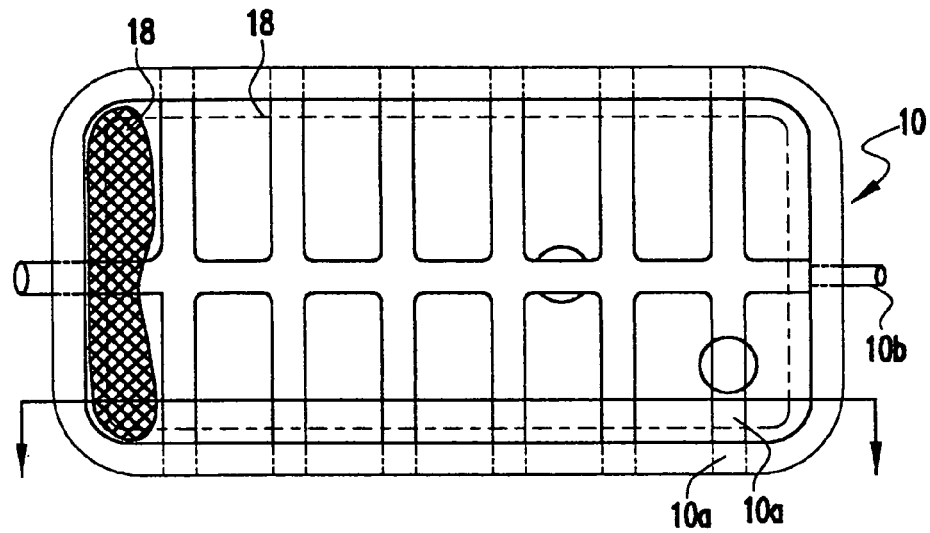
FIG. 5 shows a top view of an embodiment of the recirculating tank of the present invention.

FIG. 5 shows a top view of an embodiment of the recirculating tank 10. In this embodiment, the tank 10 includes troughs 10a integrally formed in the bottom and sides of the tank 10. The troughs 10a replace the piping 12 and 14 of the embodiment shown in FIGS. 2-4. The tank 10 may be either precast concrete or a synthetic material such as plastic, PVC or other suitable material. An inlet pipe 10b may extend from the interior to an exterior of the tank 10. A sheet 18 of plastic, PVC or other suitable material may be placed on either the bottom or the sides of the tank 10. If the sheet 18 is placed on the bottom of the tank 10, perforations are preferably placed within the sheet so that effluent can flow from the mattress filter to the integral troughs (channels) 10a.

Figure 6:
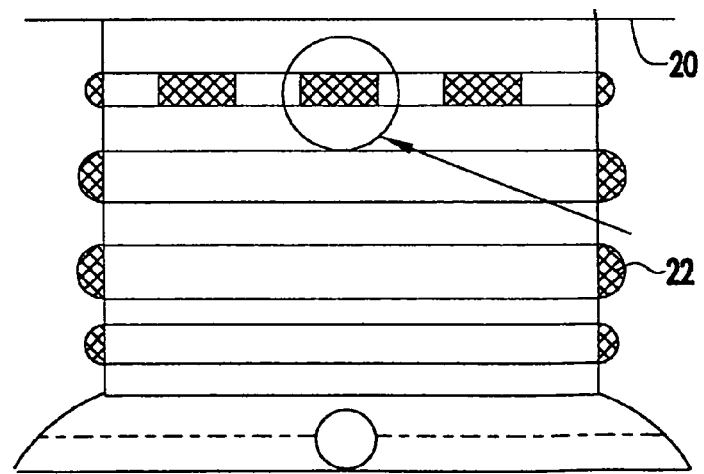
FIG. 6 shows a left end view of an embodiment of the recirculating tank of the present invention.
Figure 7:
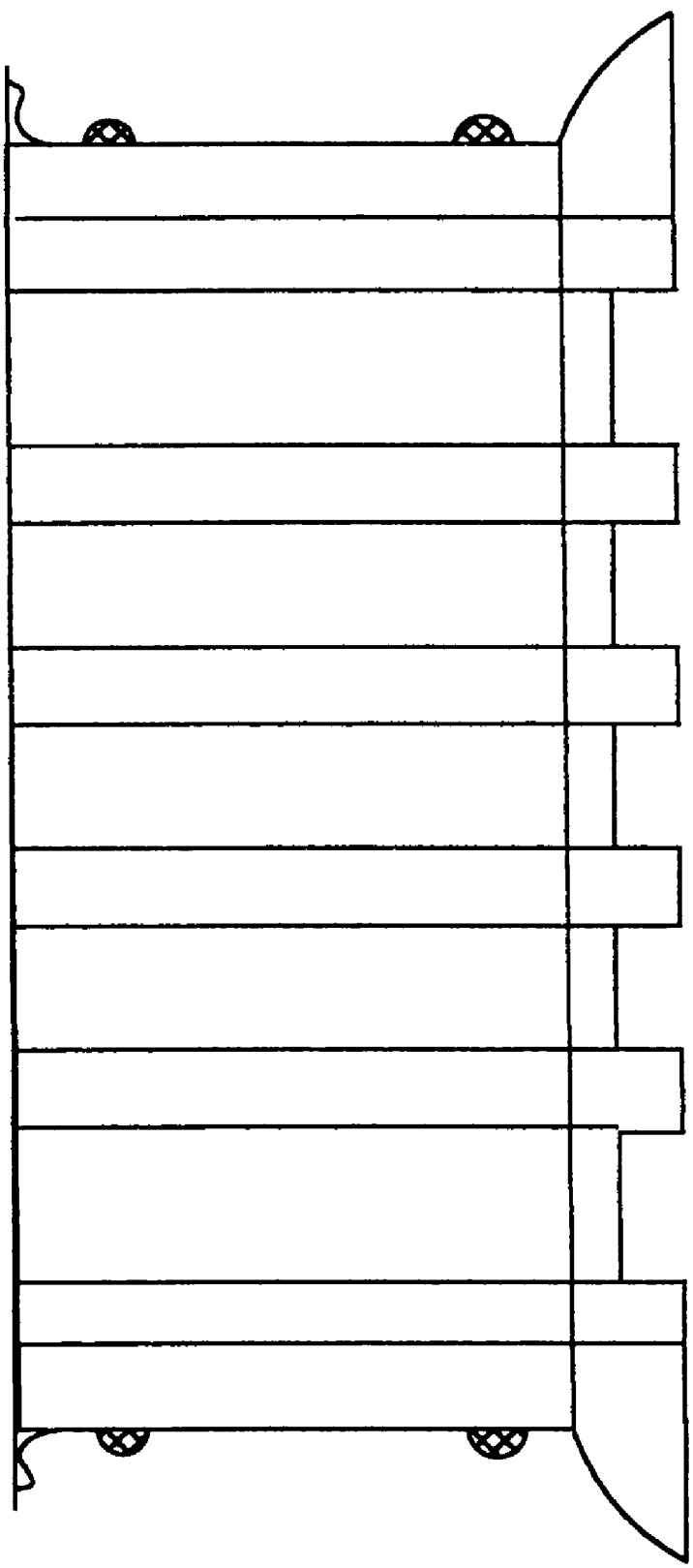
FIG. 7 shows a side view of an embodiment of the recirculating tank of the present invention.

FIG. 6 shows a left end view and FIG. 7 shows a side view of the recirculating tank of the embodiment of FIG. 5. In these views, a flange 20 and ribs 22 are shown as part of the integral construction of the tank 10.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. An effluent recirculating filter tank system adapted for use in a septic system, comprising:
   a septic system tank having a bottom and sides, and an inlet and outlet; and
   an effluent distribution system comprising troughs forming channels integrally in at least the bottom and sides of the septic system tank, the channels including at least one bottom channel being open to an inside of the septic system tank and spanning substantially between opposing ends of the septic system tank at the bottom and additional channels intersecting the bottom channel.

2. The recirculating filter tank system of claim 1, wherein the septic system tank is made from one of precast concrete and a synthetic material.

3. The recirculating filter tank system of claim 1, wherein the septic system tank includes an inlet pipe which extends from an interior to an exterior of the septic system tank.

4. The recirculating filter tank system of claim 1, further comprising a sheet placed on one of the bottom and the sides of the septic system tank.

5. An effluent recirculating filter tank system adapted for use in a septic system, comprising:
   a tank having a bottom and sides, and an inlet and outlet;
   an effluent distribution system comprising troughs forming channels integrally in at least the bottom and sides of the tank, the channels including at least one bottom channel spanning substantially between opposing ends of the tank at the bottom and additional channels intersecting the bottom channel; and
   a sheet placed on the bottom of the tank,
   wherein the sheet includes perforations so that effluent can flow from a filter to the integral troughs.

6. The recirculating filter tank system of claim 1, wherein the septic system tank further includes a flange and ribs.

7. An effluent recirculating filter tank system adapted for use in a septic system, comprising:
   a septic system tank having a bottom and sides, and an inlet and an outlet;
   at least the bottom of the septic system tank comprising integrally formed troughs which open to an inside of the septic system tank;
   at least one of the integrally formed troughs of the bottom of the septic system tank spanning the bottom of the septic system tank and extending between different sides of the septic system tank; and
   at least one of:
      said integrally formed trough spanning the bottom of the septic system tank having one end extending to a first side of the septic system tank containing the inlet and another end extending to a second side of the septic system tank containing the outlet; and
      at least another of the integrally formed troughs intersecting said integrally formed trough spanning the bottom of the septic system tank.

* * * * *